(12) United States Patent
Lin

(10) Patent No.: US 6,230,412 B1
(45) Date of Patent: May 15, 2001

(54) FRAME OF HACKSAW

(76) Inventor: Kun-Meng Lin, No. 44-17, Han Nan St., Wen Te Village Hua Tan Hsiang, Chang Hua Hsien (TW)

(*) Notice: Subject to any disclaimer, the term of this patent is extended or adjusted under 35 U.S.C. 154(b) by 0 days.

(21) Appl. No.: 09/504,375

(22) Filed: Feb. 15, 2000

(51) Int. Cl.$^7$ .................................................... B23D 49/12
(52) U.S. Cl. ................................. 30/512; 30/507; 30/513
(58) Field of Search ............................. 30/507, 513, 509, 30/510, 511, 512

(56) References Cited

U.S. PATENT DOCUMENTS

| | | | |
|---|---|---|---|
| 1,540,201 | * 6/1925 | Voltz | 30/510 |
| 2,208,837 | * 7/1940 | Eix | 30/510 |
| 2,556,093 | * 6/1951 | Leatherman | 30/511 |
| 2,788,036 | * 4/1957 | Kromsten | 30/511 |
| 3,082,803 | * 3/1963 | Dickstein | 30/511 |
| 3,724,519 | * 4/1973 | McCord, Jr. | 30/512 |
| 5,873,170 | * 2/1999 | Stanley | 30/510 |
| 5,920,994 | * 7/1999 | Schneider | 30/507 |

* cited by examiner

Primary Examiner—Rinaldi I. Rada
Assistant Examiner—Omar Flores-Sánchez
(74) Attorney, Agent, or Firm—Charles E. Baxley

(57) ABSTRACT

A hacksaw including a frame, a handle, an end piece, and a blade. The frame has an arcuate support rod which is provided at one end thereof with a protrusion and a plurality of recesses, and at the other end thereof with a protrusion and a plurality of recesses. The handle has a top cross rod which is provided with a receiving slot and a plurality of projections and is fastened at one end thereof to the arcuate support rod such that the receiving slot of the top cross rod receives the protrusion of the arcuate support rod, and that the projections of the handle are received in the recesses of the arcuate support rod. The handle is provided with a fastening member opposite in location to the top cross rod for fastening one end of the blade. The end piece is fastened to other end of the arcuate support rod and is provided with a slot for receiving the protrusion of the arcuate support rod, and a plurality of projections which are received in the recesses of the arcuate support rod. The end piece is provided with a locating member for locating other end of the blade.

5 Claims, 11 Drawing Sheets

FRAME OF HACKSAW

TECHNICAL FIELD

The present invention relates generally to a hacksaw, and more particularly to a frame of the hacksaw.

BACKGROUND ART

As shown in FIGS. 1, a hacksaw 10 of the prior art comprises a handle 11, a frame 12, and a blade 1. The frame 12 is of an inverted U-shaped construction and is provided with two parallel arms 13 and 14 between which the blade 1 is held.

The prior art hacksaw 10 is defective in design in that it can not be easily maneuvered or even used in a limited space because of the shape of the frame 12.

SUMMARY OF THE INVENTION

The primary objective of the present invention is to provide a hacksaw which is free from the deficiencies of the prior art hacksaw described above.

In keeping with the principle of the present invention, the foregoing objective of the present invention is attained by a hacksaw comprising a handle, a curved support rod, an end piece, and a blade. The curved support rod is fastened at one end to the handle and at the other end thereof to the end piece. The blade is held between the handle and the end piece.

The foregoing objective, features and functions of the present invention will be more readily understood upon a thoughtful deliberation of the following detailed description of the embodiments of the present invention with reference to the accompanying drawings.

DETAILED DESCRIPTION OF THE INVENTION

Figure 1:
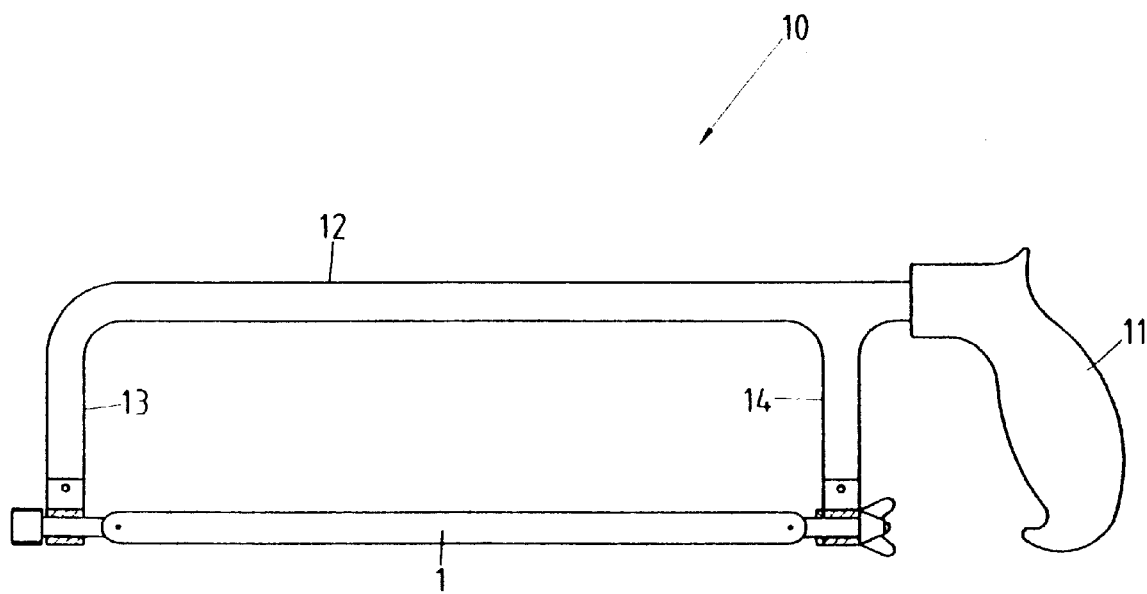
FIG. 1 shows a schematic plan view of a hacksaw of the prior art.
Figure 2:
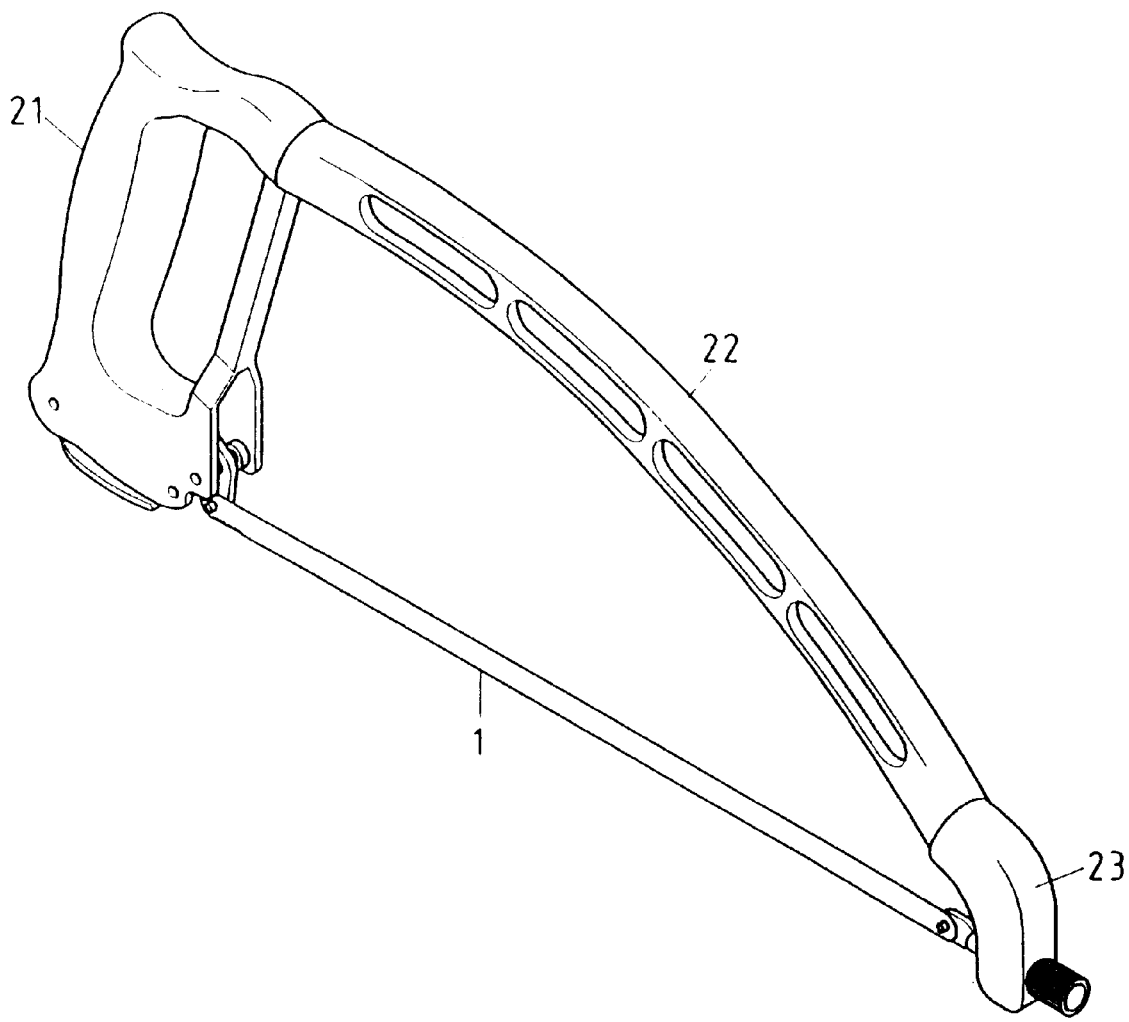
FIG. 2 shows a perspective view of a hacksaw of the first preferred embodiment of the present invention.
Figure 3:
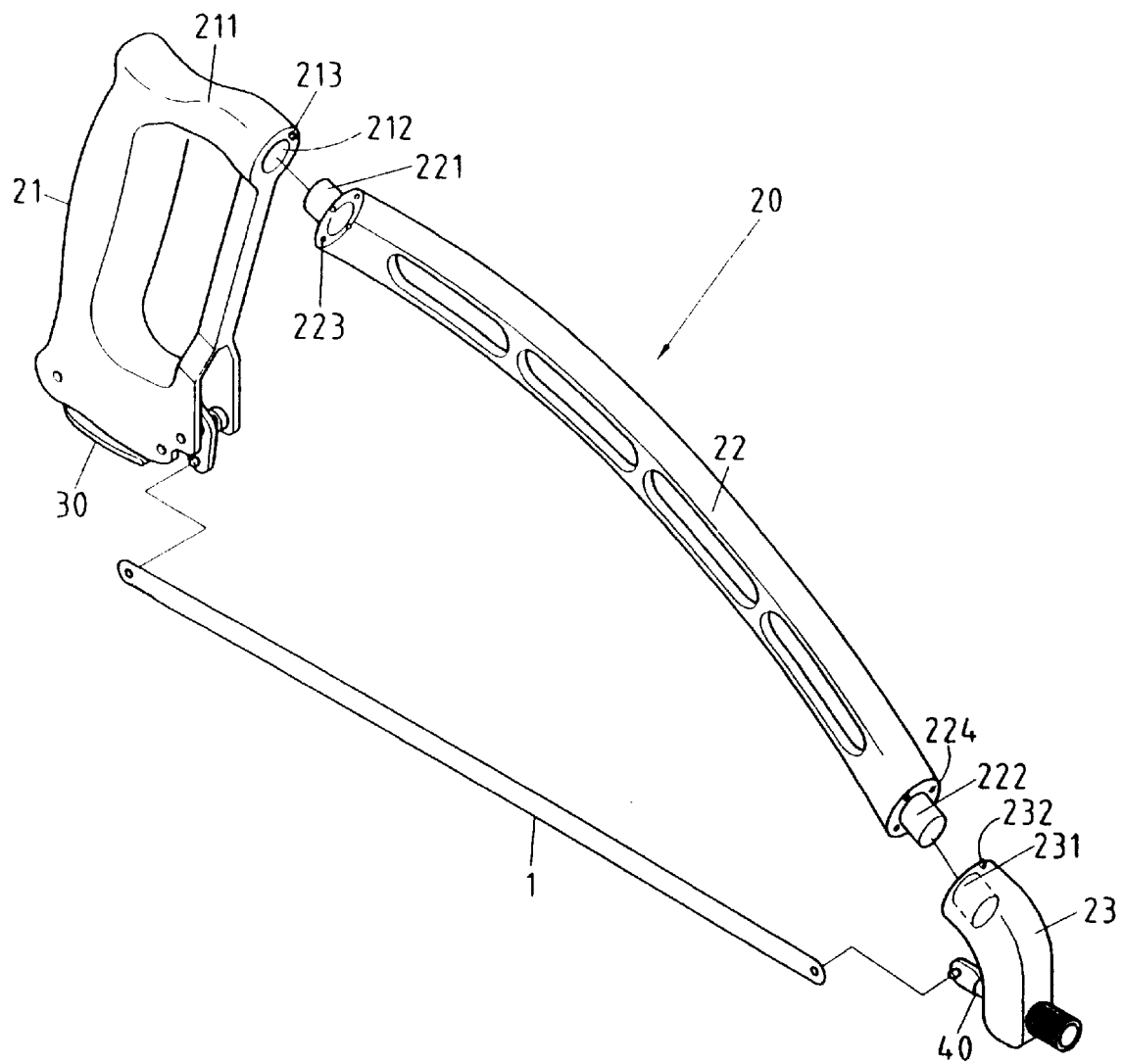
FIG. 3 shows an exploded view of the hacksaw of the first preferred embodiment of the present invention.
Figure 4:
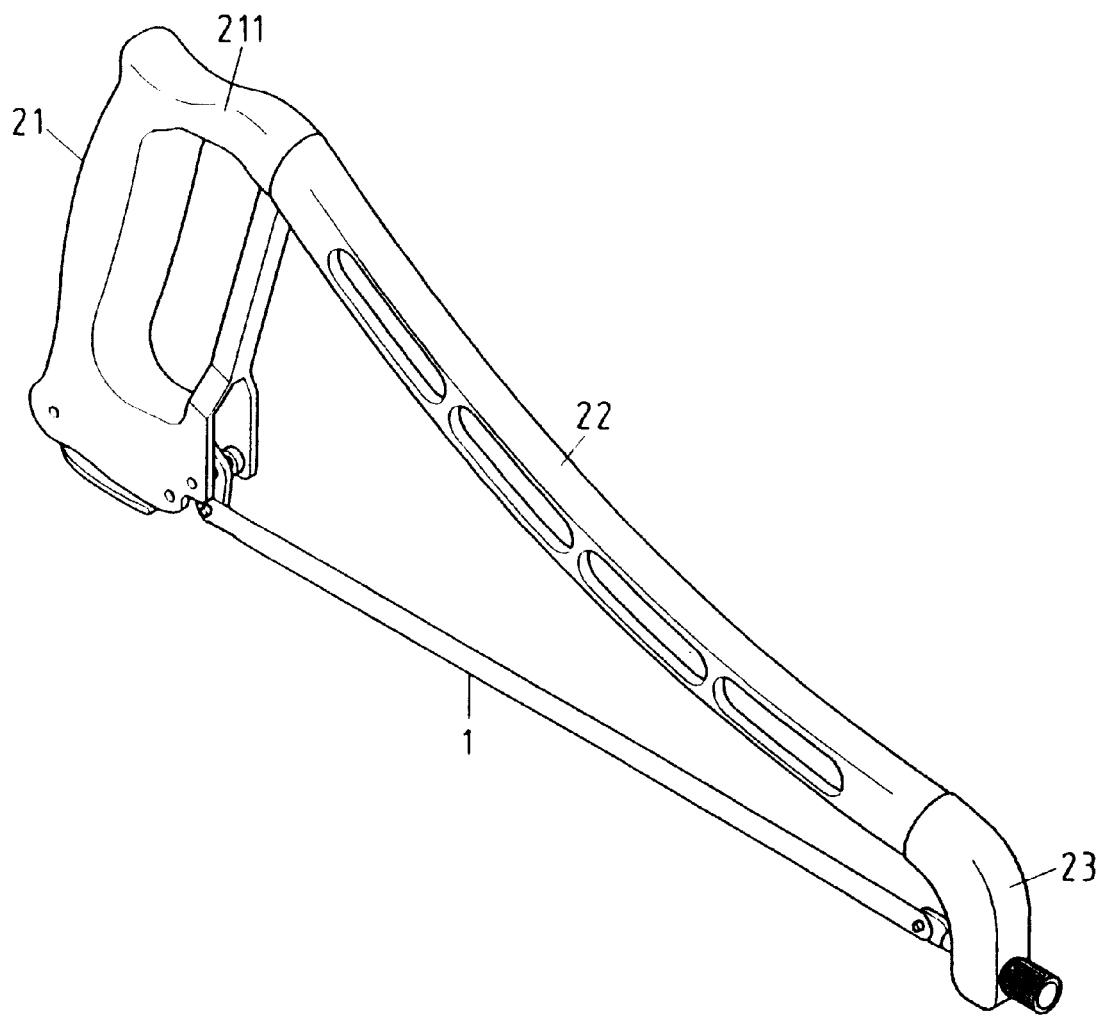
FIG. 4 shows a perspective view of the hacksaw of the first preferred embodiment of the present invention.
Figure 5:
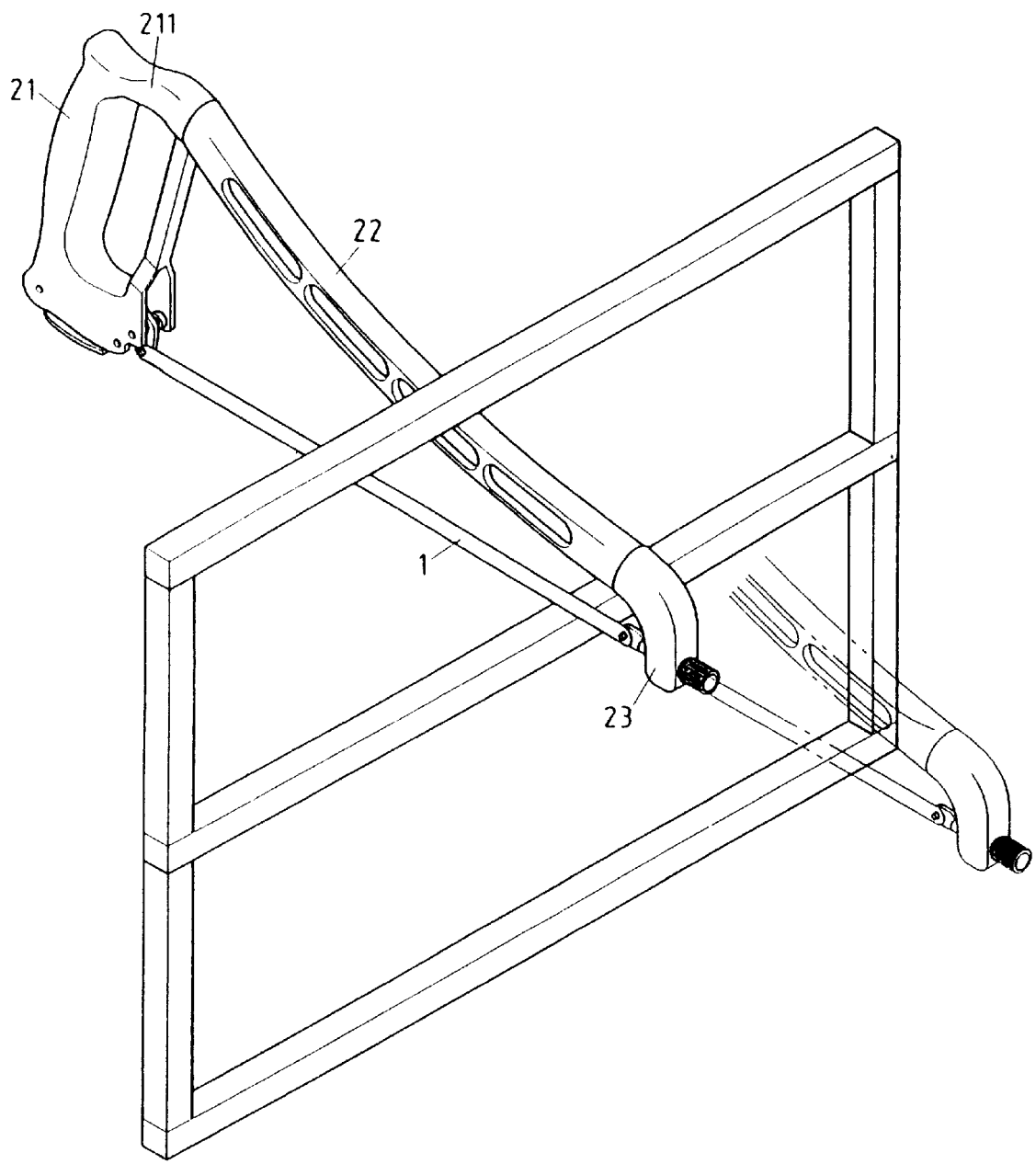
FIG. 5 shows a schematic view of the hacksaw of the first preferred embodiment of the present invention in use.

As shown in FIGS. 2–5, a hacksaw embodied in the present invention comprises a frame 20, a handle 21, and a blade 1.

The frame 20 has an arcuate support rod 22, which is provided at one end thereof with a protrusion 221 and a plurality of recesses 223, and at the other end thereof with a protrusion 222 and a plurality of recesses 224.

The handle 21 has a top cross rod 211 which is provided with a receiving slot 212 and a plurality of projections 213. The arcuate support rod 22 is fastened at one end thereof to the top cross rod 211 of the handle 21 such that the protrusion 221 of the arcuate support rod 22 is received in the receiving slot 212 of the handle 21, and that the recesses 223 of the arcuate support rod 22 receive the projections 213 of the handle 21. The handle 21 is provided with a fastening member 30 which is opposite in location to the top cross rod 211 and is used to fasten one end of the blade 1.

An end piece 23 is fastened to the other end of the arcuate support rod 22 and is provided with a slot 231 which receives the protrusion 222 of the arcuate support rod 22, and with a plurality of projections 232 which are received in the recesses 224 of the arcuate support rod 22. The end piece 23 is provided with a locating member 40 for locating the end of the blade 1.

Figure 6:
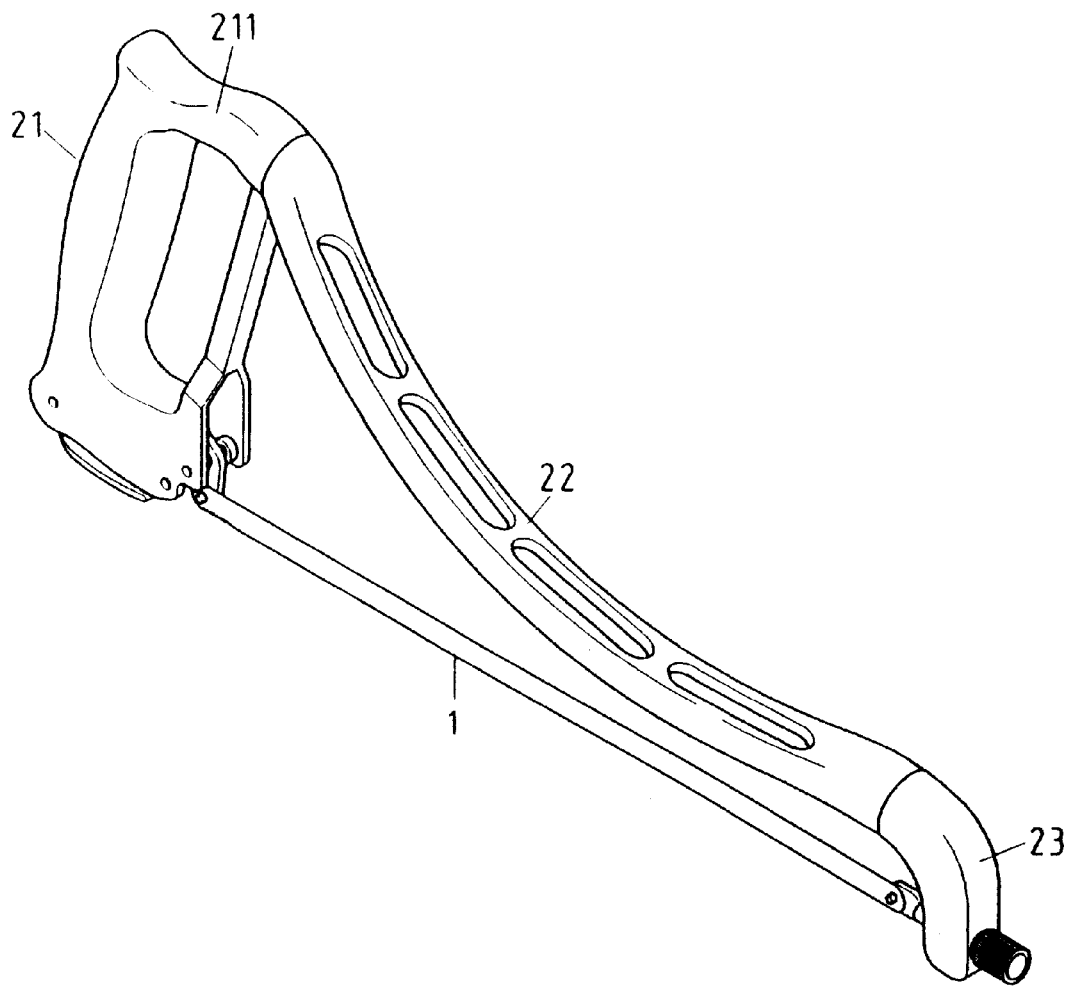
FIG. 6 shows a perspective view of a hacksaw of the second preferred embodiment of the present invention.
Figure 7:
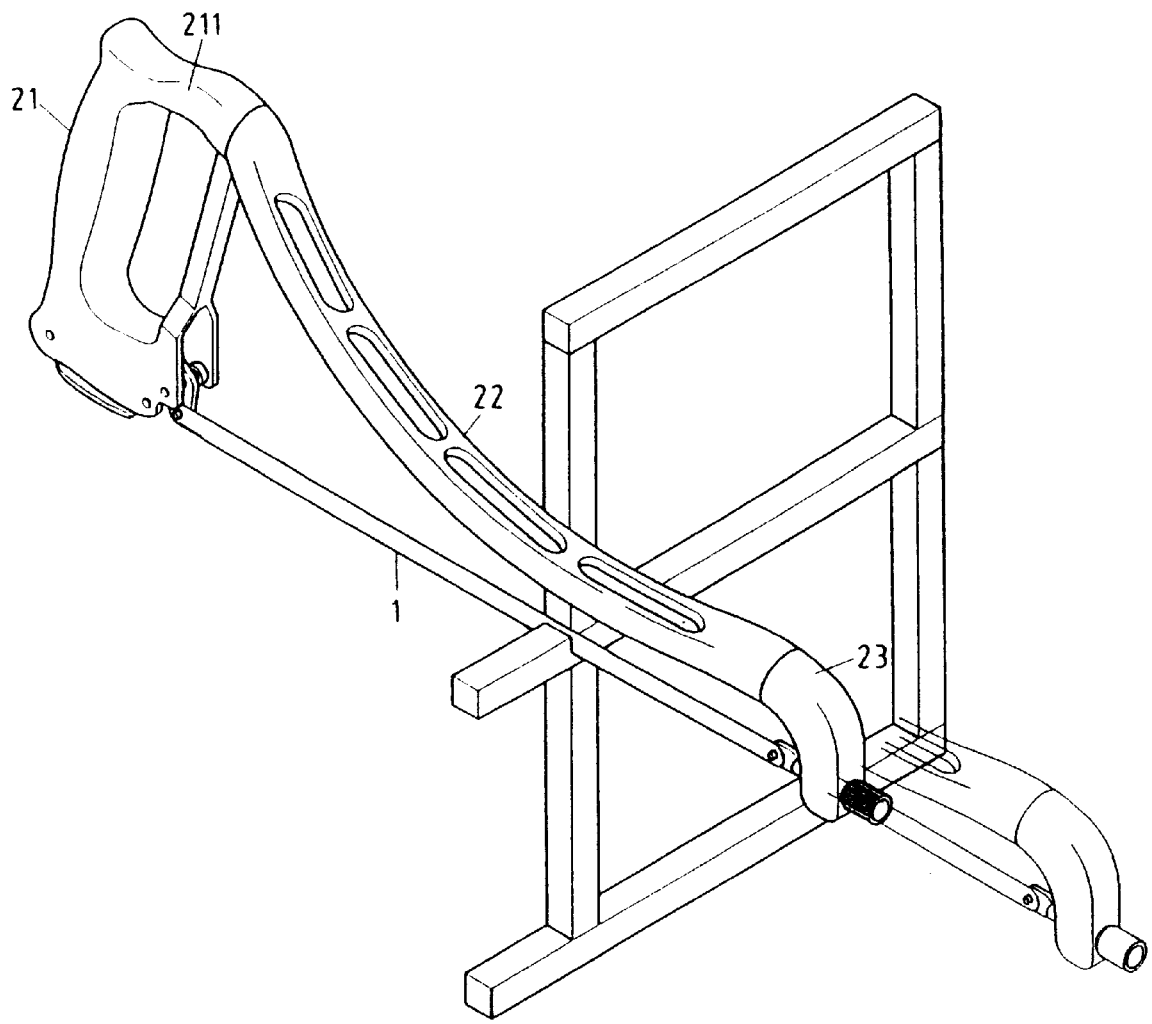
FIG. 7 shows a schematic view of the hacksaw of the second preferred embodiment of the present invention in use.
Figure 8:
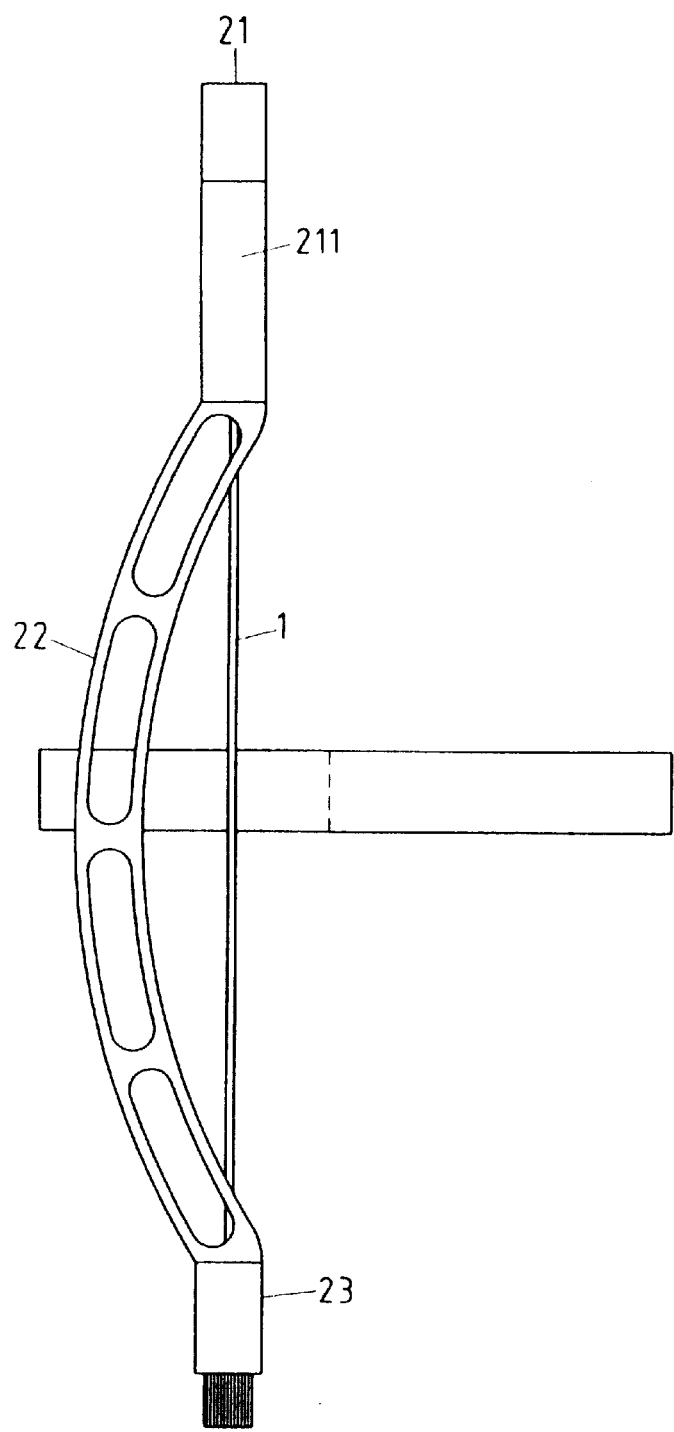
FIG. 8 shows a top view of the hacksaw of the second preferred embodiment of the present invention in use.

As shown in FIGS. 6–8, the arcuate support rod 22 of the present invention has a 90-degree curvature to result in a substantial decrease in height of the front end of the hacksaw of the present invention, so as to facilitate the operating of the hacksaw in a place where there is only a little room for maneuvering the hacksaw.

Figure 9:
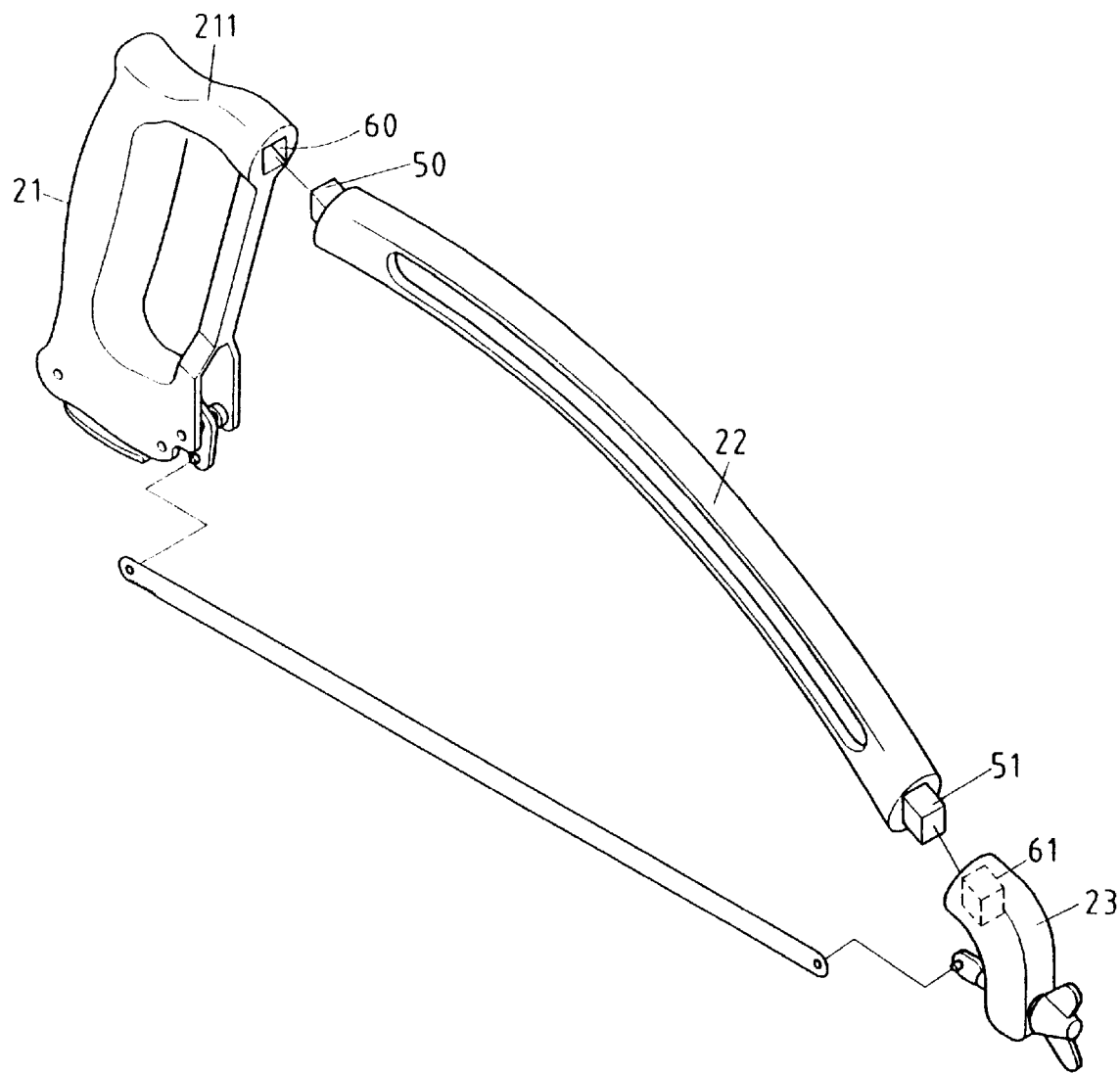
FIG. 9 shows an exploded view of a hacksaw of the third preferred embodiment of the present invention.
Figure 10:
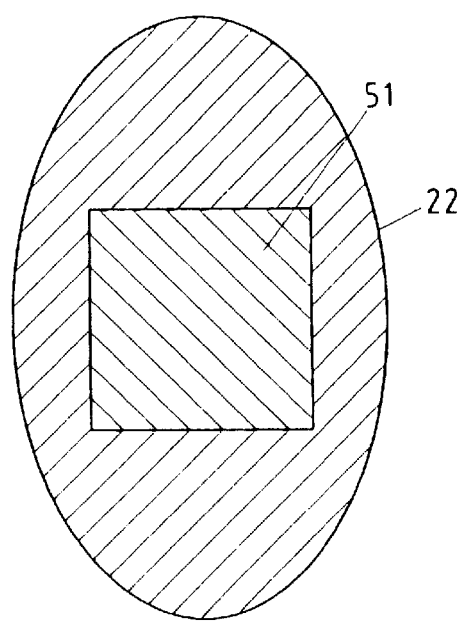
FIG. 10 shows a sectional view of a hacksaw of the fourth preferred embodiment of the present invention.
Figure 11:
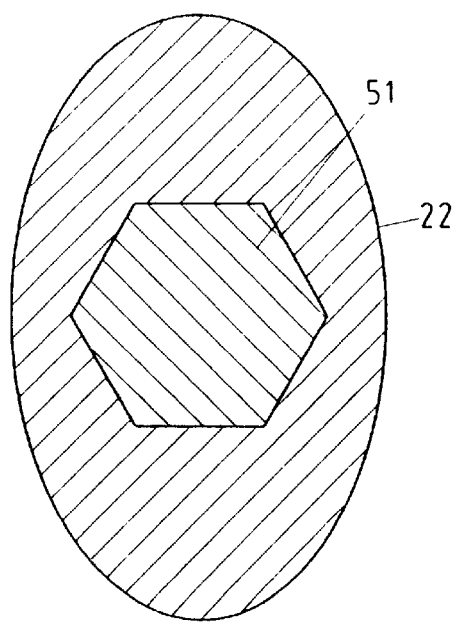
FIG. 11 shows a sectional view of a hacksaw of the fifth preferred embodiment of the present invention.

As shown in FIGS. 9 and 10, the arcuate support rod 22 is provided with two protrusions 50 and 51, which are retained respectively in the recesses 60 and 61 of the handle 21 and the end piece 23. The protrusions 50, 51 and the recesses 60 and 61 may have a polygonal cross section, as shown in FIG. 11.

Figure 12:
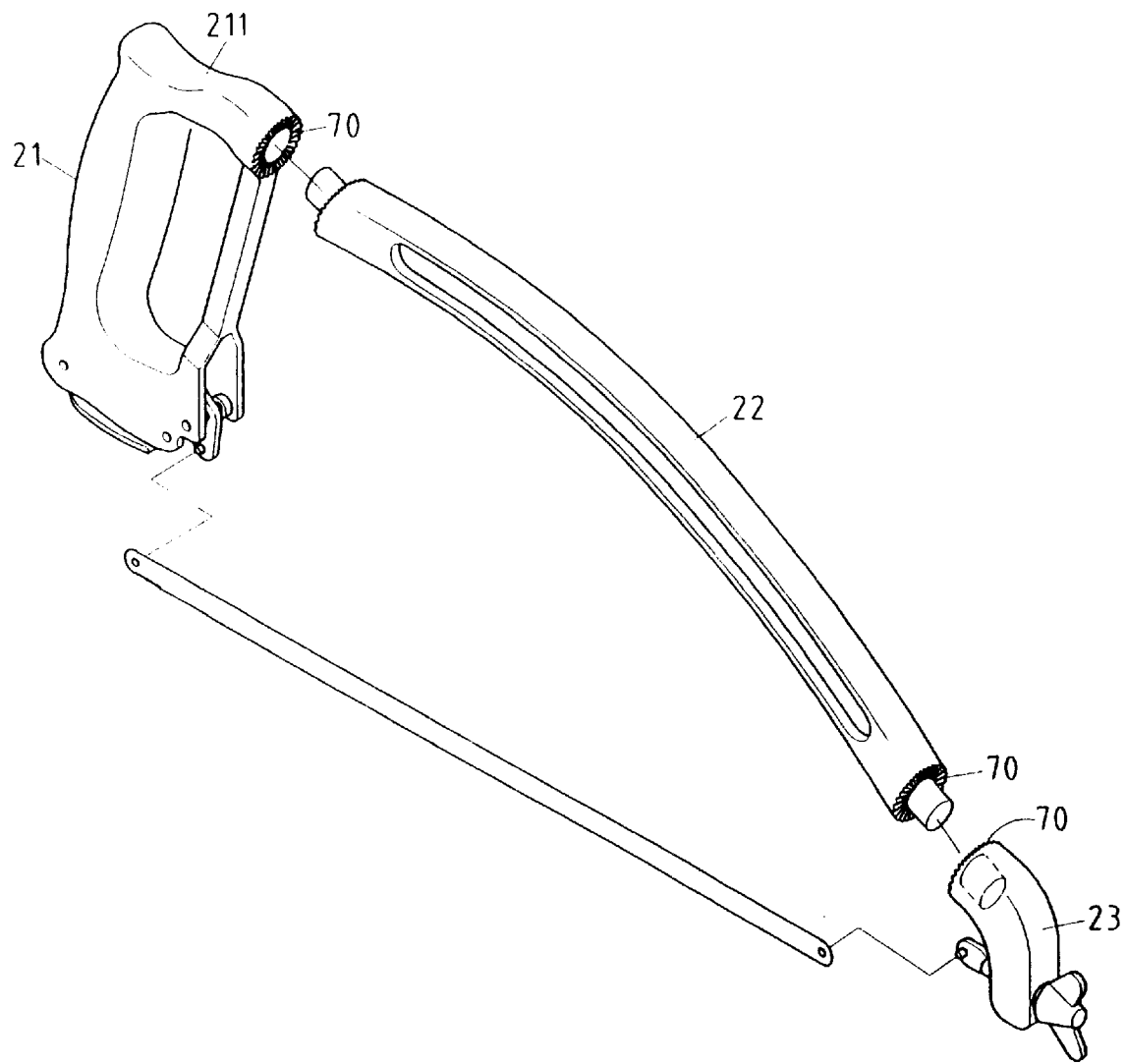
FIG. 12 shows an exploded view of a hacksaw of the sixth preferred embodiment of the present invention.

As shown in FIG. 12, the fastening ends of the arcuate support rod 22, the top cross rod 211 of the handle 21, and the end piece 23 are provided with a threaded surface 70.

The embodiments of the present invention described above are to be regarded in all respects as being merely illustrative and not restrictive. Accordingly, the present invention may be embodied in other specific forms without deviating from the spirit thereof. The present invention is therefore to be limited only by the scope of the following appended claims.

What is claimed is:

1. A hacksaw comprising:
   a frame having an arcuate support rod which is provided at one end thereof with a protrusion and a plurality of recesses, and at other end thereof with a protrusion and a plurality of recesses;
   a handle having a top cross rod which is provided with a receiving slot and a plurality of projections and is fastened at one end thereof with said arcuate support rod such that said receiving slot of said top cross rod receives said protrusion of said arcuate support rod, and that said projections of said handle are received in said recesses of said arcuate support rod, said handle provided with a fastening member opposite in location to said top cross rod for fastening one end of a blade; and an end piece fastened with other end of said arcuate support rod and provided with a slot for receiving said protrusion of said arcuate support rod, said end piece further provided with a plurality of projections whereby said projections are received in said recesses of said arcuate support rod, said end piece further provided with a locating member for locating other end of said blade.

2. The hacksaw as defined in claim 1, wherein said arcuate support rod has a 90-degree curvature.

3. The hacksaw as defined in claim 1, wherein said arcuate support rod is provided with two protrusions whereby said two protrusions are respectively received in recesses of said handle and said end piece.

4. The hacksaw as defined in claim 1, wherein said protrusions and said recesses have a polygonal cross section.

5. The hacksaw as defined in claim 1, wherein the fastening ends of said arcuate support rod, said top cross rod of said handle, and said end piece are provided with a threaded surface.

\* \* \* \* \*